US012236811B2

(12) United States Patent
Vitiello et al.

(10) Patent No.: US 12,236,811 B2
(45) Date of Patent: *Feb. 25, 2025

(54) ON-AIR STATUS INDICATOR

(71) Applicant: OAW Holdings LLC, Carmel, CA (US)

(72) Inventors: Michael Vitiello, Carmel, CA (US); Clint Ditto, Waco, TX (US)

(73) Assignee: OAW Holdings LLC, Carmel, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/420,379

(22) Filed: Jan. 23, 2024

(65) Prior Publication Data

US 2024/0161662 A1 May 16, 2024

Related U.S. Application Data

(63) Continuation of application No. 17/582,453, filed on Jan. 24, 2022, now Pat. No. 11,922,835.

(60) Provisional application No. 63/141,673, filed on Jan. 26, 2021.

(51) Int. Cl.
*G09F 9/33* (2006.01)
*G09F 13/04* (2006.01)

(52) U.S. Cl.
CPC ................ *G09F 9/33* (2013.01); *G09F 13/04* (2013.01)

(58) Field of Classification Search
USPC ............ 340/815.45, 815.49, 815.56, 815.65, 340/815.67, 14.69, 825.64, 7.63, 340/7.57–7.62, 7.55–7.56
See application file for complete search history.

(56) References Cited

U.S. PATENT DOCUMENTS

| | | | | |
|---|---|---|---|---|
| 5,212,724 A * | 5/1993 | Nazarenko | H04L 25/06 370/327 |
| 11,922,835 B2 * | 3/2024 | Vitiello | G09F 9/33 |
| 2004/0085286 A1 * | 5/2004 | Wang | G06F 3/03545 345/156 |
| 2011/0083074 A1 * | 4/2011 | Jellison, Jr. | G06F 3/0489 715/727 |
| 2013/0079236 A1 * | 3/2013 | Holmes | G01N 35/00 204/600 |
| 2020/0326781 A1 * | 10/2020 | Tan | G06F 3/0488 |

* cited by examiner

*Primary Examiner* — Daniel Previl
(74) *Attorney, Agent, or Firm* — Leason Ellis LLP

(57) ABSTRACT

An on-air status indicator device, configured for use with a communication device coupled to a microphone and a camera, having at least one illumination surface comprising a first portion, a second portion, and a third portion, wherein in a first illumination mode when a user of the communication device starts or joins a meeting via a communication application executed on the communication device, the first portion of the at least one illumination surface is illuminated, in a second illumination mode the microphone is live in association with the meeting via the communication application, the second portion of the at least one illumination surface is illuminated; and in a third illumination mode when the camera is broadcasting in association with the meeting via the communication application, the third portion of the at least one illumination surface is illuminated.

19 Claims, 12 Drawing Sheets
(2 of 12 Drawing Sheet(s) Filed in Color)

ON-AIR STATUS INDICATOR

CROSS-REFERENCE TO RELATED APPLICATIONS

The present application is a continuation of, and claims priority to, U.S. patent application Ser. No. 17/582,453, filed Jan. 24, 2022, which claims the benefit of and priority to U.S. Provisional Patent Application No. 63/141,673, filed on Jan. 26, 2021, all of which are incorporated by reference, as if expressly set forth in their respective entireties herein.

FIELD OF THE DISCLOSURE

The present disclosure generally relates to indicator lights for alerting a user or others to one's status or availability.

BACKGROUND OF THE DISCLOSURE

In this era of "smart working", many people either work from a home office, possibly a kitchen, den or spare room, or in an office space having an open floor plan, i.e. no separate individual offices. Interruptions are a major issue in home working or office settings. Families and coworkers need to agree on guidelines that clarify when it is okay to interrupt each other. Status lights are sometimes used to notify others that a family member or coworker is busy or wishes not to be disturbed.

Other times when on a video call, users are scolded to "unmute your microphone" or are told "we can't hear you" or even worse, someone on the call doesn't realize their microphone or camera are on and they broadcast something embarrassing for all to see and hear.

There are currently products on the market that use different color LED devices as a means to indicate online "presence" for others to see, including busy/available status, message waiting and incoming calls. Each one has different levels of automated, programmable, and/or manual control. They are all designed for, and marketed to, office environments to prevent interruptions using a single light, glowing a certain color. Examples of such products include Luxafor™ Flag, Kuando™ Busylight, and Embrava® Blynclight.

While such devices are useful in providing an indication that one is otherwise occupied, none of these devices would indicate when a microphone is on or muted, nor would these devices indicate when a camera is live or paused. This is a particularly serious drawback especially when workspaces are shared with living spaces.

The present invention provides solutions that overcome these drawbacks.

SUMMARY OF THE DISCLOSURE

The present on-air status indicator, configured for use with a communication device having a microphone and camera, comprises a first illumination mode if a user starts or joins a meeting; a second illumination mode if a user's microphone is live; and a third illumination if the user's camera is broadcasting.

In recognition of the above drawbacks for the increasing number of people engaged in remote work, "mute button" peripheral devices have been marketed that give the user control over muting an application being executed on a computer. Such peripheral devices are connectable to a computer on which a video and/or audio conference is executed. The devices incorporate a light that illuminates when a microphone coupled to the computer is on—examples include the MuteMe™, the muteSync™, and the Luxafor™ Mute Button. These products only indicate, however, the microphone status in connection with the computer to which these products are connected and do not, for example, separately indicate a conference status or a video camera status.

A method for indicating on-air status comprises: activating a first illumination mode if a user starts or joins a meeting; activating a second illumination mode if a user's microphone is live; and activating a third illumination if the user's camera is broadcasting.

An automated computer program and system are also provided to indicate the status of a computer audio call, video call or conference by illuminating an external device to indicate the on/off status of the software, the mute/unmute status of the microphone, the on/off status of the camera and/or the screen sharing status, via USB, NFC, Bluetooth and/or Wi-Fi connection.

According to an example implementation of the present disclosure, an on-air status indicator device, configured for use with a communication device coupled to a microphone and a camera, comprises: a housing having two illumination surfaces adapted to be viewable from two opposing sides of the on-air status indicator, the two illumination surfaces each comprising a first portion, a second portion, and a third portion; a controller; and an interface to the communication device, wherein in a first illumination mode when a user of the communication device starts or joins a meeting via a communication application executed on the communication device, the controller causes respective first portions of the two illumination surfaces to be illuminated, in a second illumination mode when the microphone is live in association with the meeting via the communication application, the controller causes the respective second portions of the two illumination surfaces to be illuminated, and in a third illumination mode when the camera is broadcasting in association with the meeting via the communication application, the controller causes the respective third portions of the two illumination surfaces to be illuminated.

In an example implementation, the housing comprises: a first interior portion in correspondence with the respective first portions of the two illumination surfaces; a second interior portion in correspondence with the respective second portions of the two illumination surfaces; and a third interior portion in correspondence with the respective third portions of the two illumination surfaces, at least one light source coupled to the controller is disposed in each of the first, second, and third interior portions, and the controller causes the respective first, second, and third portions to be illuminated by activating the respective light sources.

According to an example implementation of the present disclosure, an on-air status indicator device, configured for use with a communication device coupled to a microphone and a camera, comprises: a housing having at least one illumination surface adapted to be viewable from a side of the on-air status indicator, the at least one illumination surface comprising a first portion, a second portion, and a third portion; a controller; and an interface to the communication device, wherein in a first illumination mode when a user of the communication device starts or joins a meeting via a communication application executed on the communication device, the controller causes the first portion of the at least one illumination surface to be illuminated, in a second illumination mode when the microphone is live in association with the meeting via the communication application, the controller causes the second portion of the at least one illumination surface to be illuminated; and in a third illumination mode when the camera is broadcasting in association with the meeting via the communication application, the controller causes the third portion of the at least one illumination surface to be illuminated.

In an example implementation, the housing comprises: a first interior portion in correspondence with the first portion of the at least one illumination surface; a second interior portion in correspondence with the second portion of the at least one illumination surface; and a third interior portion in correspondence with the third portion of the at least one illumination surface, at least one light source coupled to the controller is disposed in each of the first, second, and third interior portions, and the controller causes the respective first, second, and third portions to be illuminated by activating the respective light sources.

According to an example implementation, in a fourth illumination mode when the user of the communication device shares screen in the meeting, the controller causes the first portion of the at least one illumination surface to illuminate with a pulsing light.

In an example implementation, the third illumination mode transitions to the second illumination mode and the controller causes the third portion of the at least one illumination surface to not be illuminated when the camera is switched off in association with the meeting via the communication application.

In an example implementation, the third illumination mode transitions to a fourth illumination mode where the controller causes the second portion of the at least one illumination surface to not be illuminated when the microphone is muted in association with the meeting via the communication application.

In an example implementation, the first portion illuminates in a first color and the second portion illuminates in a second color that is different from the first color.

In an example implementation, the third portion illuminates in a third color that is different from the first color and the second color.

In an example implementation, the controller determines the first, second, or third illumination mode by receiving an indicator via an application programming interface (API) executed on the communication device.

In an example implementation, the indicator is generated based on scanning one or more elements of the communication application that is executed on the communication device via the API, the one or more elements comprising associations with respective one or more of the microphone and the camera.

In an example implementation, one or more of the first, second, and third portions are illuminated via a graphical user interface control provided at the communication device.

According to an example implementation of the present disclosure, an on-air status indicator device, configured for use with a communication device coupled to a microphone and a camera, comprises: a housing having at least one illumination surface adapted to be viewable from a side of the on-air status indicator, the at least one illumination surface comprising a first portion, a second portion, and a third portion; a controller; and an interface to the communication device, wherein in a first illumination mode when an application associated with the indicator device is executed at the communication device, the controller causes the first portion of the at least one illumination surface to be illuminated; in a second illumination mode when a user of the communication device starts or joins a meeting via a communication application executed on the communication device, the controller causes the illuminated first portion of the at least one illumination surface to change in one or more of a color and an illumination period, in a third illumination mode when the microphone is live in association with the meeting via the communication application, the controller causes the second portion of the at least one illumination surface to be illuminated; and in a fourth illumination mode when the camera is broadcasting in association with the meeting via the communication application, the controller causes the third portion of the at least one illumination surface to be illuminated.

According to an example implementation of the present disclosure, a method of a communication device for controlling an on-air status indicator device adapted to indicate operating statuses of a microphone and a camera coupled to the communication device, comprises: scanning, at the communication device, one or more elements of a communication application that is executed on the communication device, the one or more elements comprising associations with respective one or more of the microphone and the camera; determining one or more of a meeting status, a camera operating status, and a microphone operating status based on the scanning; transmitting a control signal to the on-air status indicator device based on the determined one or more of the meeting status, the camera operating status, and the microphone operating status, wherein in a first illumination mode when a user of the communication device starts or joins a meeting via the communication application executed on the communication device, the control signal is configured to cause a first portion of at least one illumination surface of the on-air status indicator device to be illuminated, in a second illumination mode when the microphone is live in association with the meeting via the communication application, the control signal is configured to cause a second portion of the at least one illumination surface to be illuminated; and in a third illumination mode when the camera is broadcasting in association with the meeting via the communication application, the control signal is configured to cause a third portion of the at least one illumination surface to be illuminated, According to an example implementation of the present disclosure, a method of a communication device for controlling an on-air status indicator device adapted to indicate operating statuses of a microphone and a camera coupled to the communication device, comprises: executing, at the communication device, an indicator device control process; transmitting, via the executed indicator device control process, an initial control signal to cause a first portion of at least one illumination surface of the on-air status indicator device to be illuminated in a first illumination mode; scanning, by the indicator device control process, one or more elements of a communication application that is executed on the communication device, the one or more elements comprising associations with respective one or more of the microphone and the camera; determining, by the indicator device control process, one or more of a meeting status, a camera operating status, and a microphone operating status based on the scanning; transmitting, by the indicator device control process, a status control signal to the on-air status indicator device based on the determined one or more of the meeting status, the camera operating status, and the microphone operating status, wherein in a second illumination mode when a user of the communication device starts or joins a meeting via the communication application executed on the communication device, the status control signal is configured to cause the illuminated first portion of the at least one illumination surface to change in one or more of a color and an illumination period, in a third illumination mode when the microphone is live in association with the meeting via the communication application, the status control signal is configured to cause a second portion of the at least one illumination surface to be illuminated; and in a fourth illumination mode when the camera is broadcasting in association with the meeting via the communication application, the status control signal is configured to cause a third portion of the at least one illumination surface to be illuminated.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various example implementations of this disclosure will be described in detail, with reference to the following figures, wherein.

Figure 1:
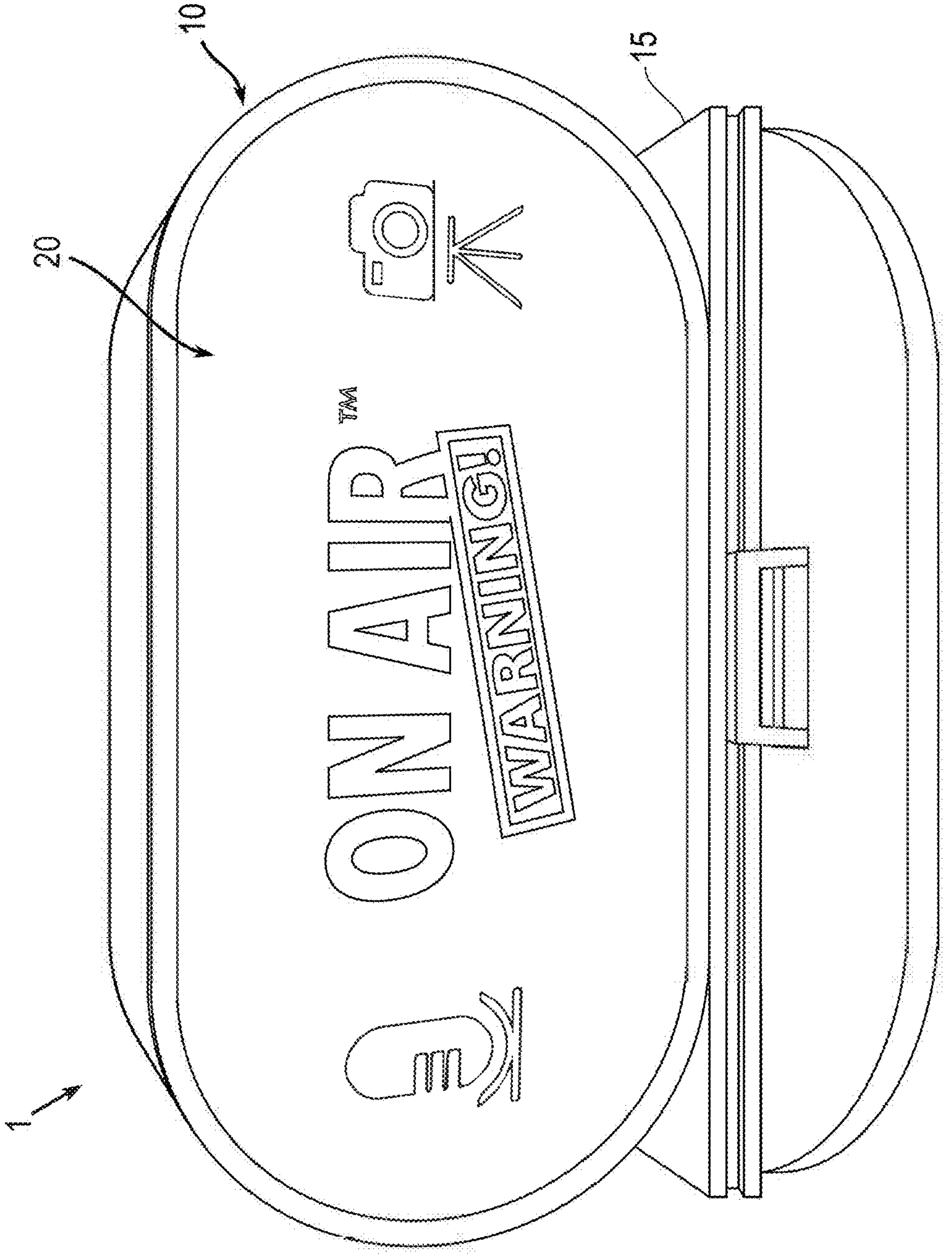
FIG. 1 is a perspective view of the indicator in an inactive mode.

It would be appreciated by one of ordinary skill in the art that the present disclosure is not limited to the precise arrangements and instrumentalities shown in the above figures.

DETAILED DESCRIPTION

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must) Similarly, the words "include," "including," and "includes" mean including but not limited to. To facilitate understanding, like reference numerals have been used, where possible, to designate like elements common to the figures.

FIG. 1 depicts an on-air indicator device 1 of the present invention in an inactivated state. The indicator device 1 comprises a housing 10 and base portion 15. The base portion 15 shown is in the form of a hollow I-bar, however, other configurations can be used. The device also comprises a cover 20, which is translucent and embodies an illumination surface based on one or more light sources inside housing 10. The cover 20 may include indicia or other markings to provide indication of the status of the user. The presently described device 1 is configured to have a translucent cover 20 (illumination surface) to cover both the back and front of the housing 10. However, a configuration with only one cover 20, can also be envisioned, having a flat back opposite thereto, which can be removably fastened to a surface using hook and loop type fasteners (Velcro®) or double-sided adhesive tape.

Thus, according to example implementations, indicator device 1 can have one illumination surface (front) or two illumination surfaces on opposing sides (front and back) of housing 10. Advantageously, indicator device 1 can be oriented independently from its associated communication device (1000), such as a computer used for a network video conference, so that the one or more illumination surfaces are viewable by people other than the user of the communication device (1000) from one or more sides of indicator device 1. As can be appreciated by one of ordinary skill in the art, indicator device 1 can incorporate different shapes with multiple different illumination/viewing surfaces for easy viewing from different directions without departing from the spirit and the scope of the present disclosure.

Figure 2A:
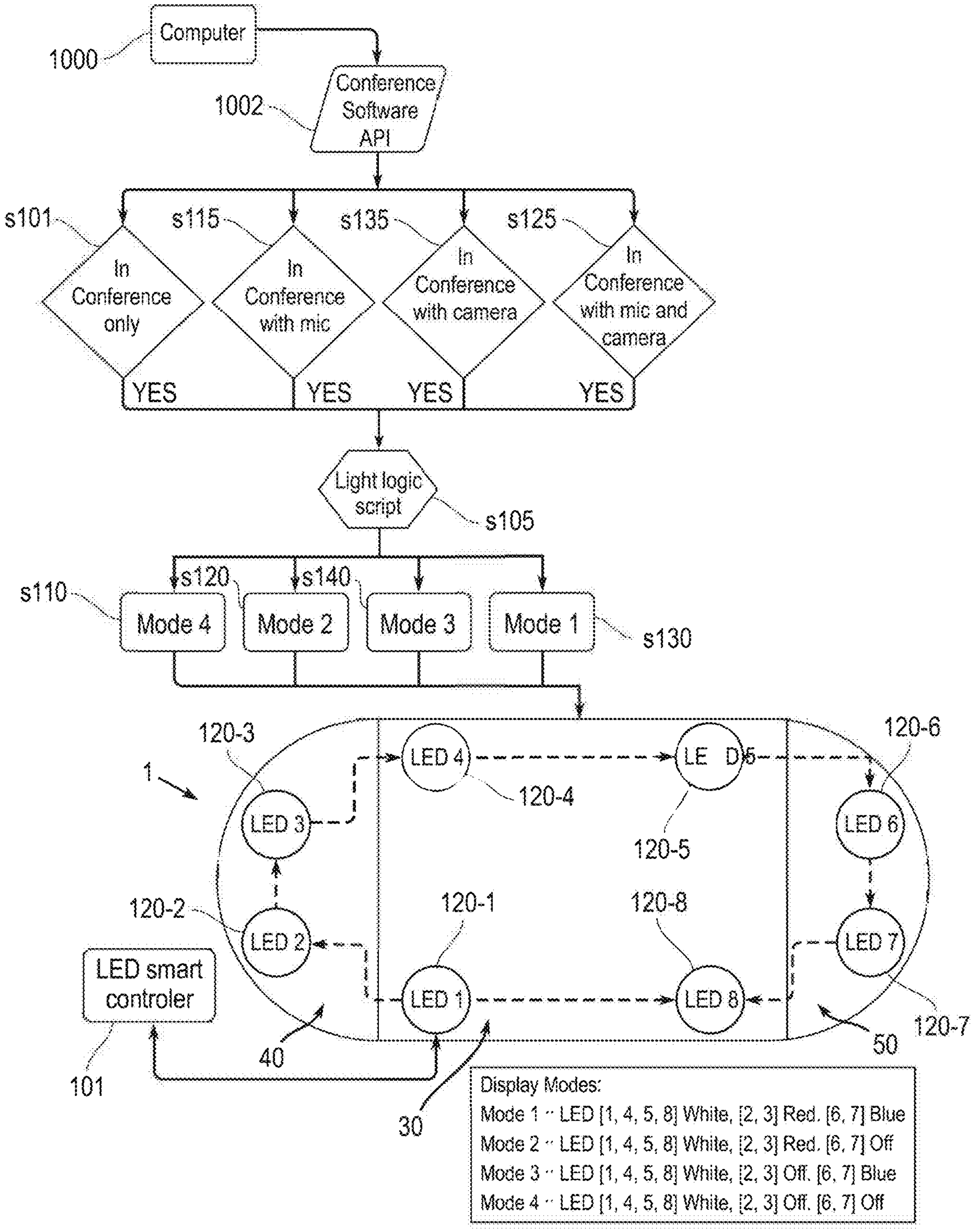
FIG. 2A is a flow diagram of an activation sequence of the on-air status.
Figure 3:
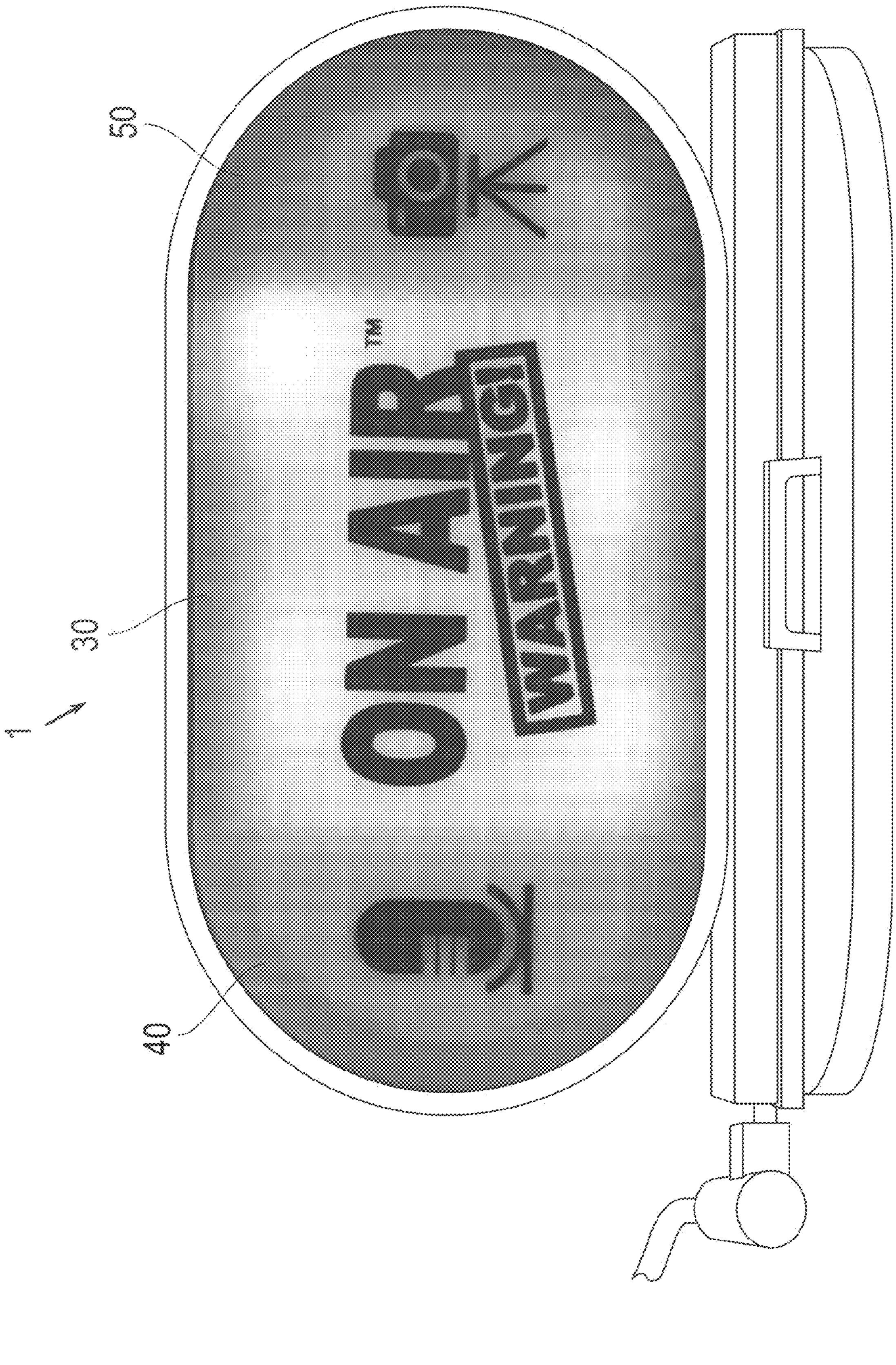
FIG. 3 is a color photograph with a perspective view of the indicator device in an active mode according to an example implementation of the present disclosure.

Referring to FIG. 2A, when a user on a computer 1000 starts or joins a meeting on-line, e.g. via Zoom®, Skype®, Google Meet®, Microsoft Teams®, FaceTime® ° etc., a conference software API 1002 of the user's computer or other communication device (e.g. tablet, cellphone, VOiP phone, etc.) 1000 determines that the user is in conference (step s101), executes a light logic script (step s105) and indicates Mode 4 (step s110) to an LED smart controller 101 (or similar device) of indicator device 1, which thereby illuminates a center (first) portion 80 of the housing 10 (FIG. 4)—e.g., one or more of light sources (light emitting diodes "LEDs") 120-1, 120-4, 120-5, and 120-8—lighting up the first portion 30 of the cover 20 (FIG. 3). If a user, while in a meeting, activates their device's microphone (1030), the conference software API 1002 of the user's computer 1000 (or other communication device) determines that the user's microphone (1030) is activated (step s115), executes a light logic script (step s105) and indicates Mode 2 (step s120) to an LED smart controller 101 (or similar device), which thereby illuminates a second portion 90 of the housing 10 (FIG. 4)—e.g., one or more of light sources 120-2 and 120-3—lighting up the second portion 40 of the cover 20, in addition to the first portion 30. If a user, while in a meeting with a microphone activated, activates their device's camera, the conference software API 1002 of the user's computer 1000 (or other communication device) determines that in addition to the user's microphone being activated, their camera (1025) is also activated (step s125) and executes a light logic script (step s105) and indicates Mode 1 (step 130)

to an LED smart controller 101 (or similar device), which thereby illuminates a third portion 100 of the housing 10 (FIG. 4)—e.g., one or more of light sources 120-6 and 120-7—lighting up the third portion 50 of the cover 20, in addition to the first and second portions 30, 40. It is noted that if a user mutes their microphone (step s135), Mode 3 (step s140) is indicated to the LED smart controller 101 and the lights illuminating the second portion 90—e.g., one or more of light sources 120-2 and 120-3—are turned off. FIG. 3 is a color photograph illustrating all of first portion 30, second portion 40, and third portion 50 of indicator device 1 activated. As illustrated in FIG. 3, these portions can be illuminated in different colors—for example, white light for first portion 30, red light for second portion 40, and blue light for third portion 50. As further shown in FIG. 3, cover 20 incorporates lettering and symbols in correspondence with the respective portions 30, 40, and 50 to highlight the respective statuses to which they relate. For example, first portion 30 incorporates an "on air warning" to indicate being "on air," or being connected to a conference. Second portion 40 incorporates a symbol for a microphone to indicate on or mute with respect to a microphone. Third portion 50 incorporates a symbol for a camera to indicate on or off with respect to a camera. As can be appreciated by one of ordinary skill in the art, different colors, letters, symbols, and/or arrangements with respect to portions 30, 40, and 50 can be incorporated to device 1 without departing from the spirit and scope of the present disclosure. As an example, custom colors can be utilized based on a user's preference set via user interface 1020.

In some example implementations, status communication messages—for example, in the form of webhooks—are exchanged among communication devices 1000 and 1000' (FIG. 2B) in a call (or conference) and one or more data processing apparatuses (not shown)—for example, a server apparatus for facilitating the network communications—such that the above-described "in conference," "microphone," and/or "camera" statuses are transmitted and confirmed at the respective communication devices 1000 and 1000'. In such example implementations, indicator device 1 reflects the statuses that are transmitted and confirmed at the computing/communication device 1000 to which it is coupled. In other example implementations, the above-described lighting/illumination modes (Modes 1-4) reflect the activation or deactivation/muting of camera (1025)(third portion 50) and microphone (1030)(second portion 40) during an associated activation (or deactivation)(first portion 30) of a video and/or audio recording session.

FIG. 2A illustrates that light sources 120-1, 120-4, 120-5, and 120-8 emit white light ("White"), light sources 102-2 and 102-3 emit red light ("Red"), and light sources 102-6 and 102-7 emit blue light ("Blue"). According to an example implementation, lights of different colors, intensities, sequences, patterns, durations, etc., can be emitted at first portion 30, second portion 40, and third portion 50 based on respective operating statuses of devices associated with communication device 1000 (such as camera 1025 and microphone 1030), communication/operating status(es) of communication device(s) 1000, connection status to network 1200, connection status to a communication session, to name a few. As one example, first portion 30 can be illuminated with a pulsed or blinking light when a user is sharing screen e.g., transmitting a still or moving image of a screen being displayed at communication device 1000 to communication device 1000'—during a communication session. In some example implementations, the light emitted at first portion 30, second portion 40, and third portion 50 can be customized by a user of communication device 1000 via software and/or hardware controls.

Figure 2B:
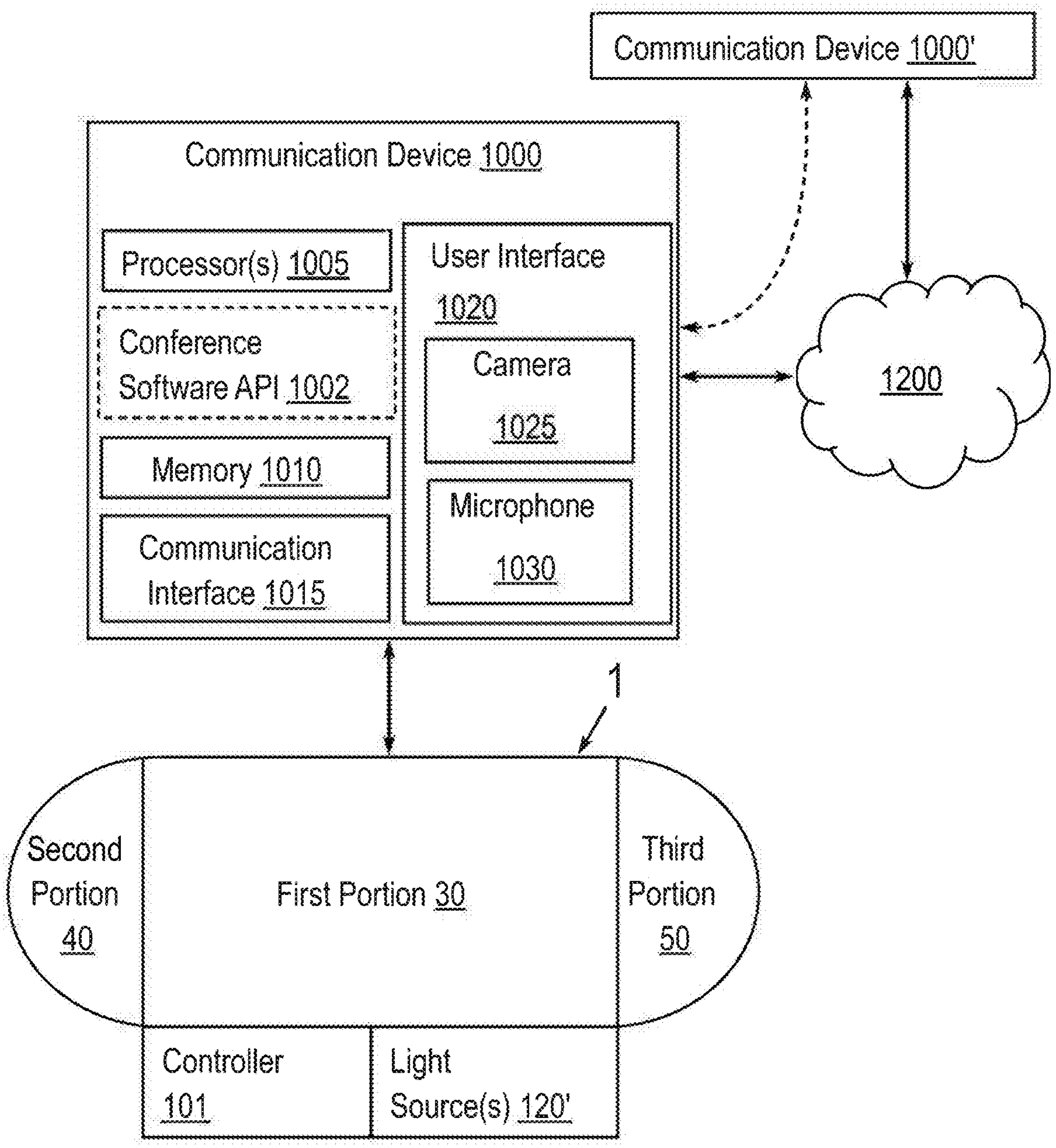
FIG. 2B is a schematic illustration of an indicator device according to an example implementation of the present disclosure for use during a network communication session.

FIG. 2B is schematic illustration of indicator device 1 and its associated communication device 1000 during a network communication session (such as a video conference meeting) with another communication device 1000' according to an example implementation of the present disclosure. As illustrated in FIG. 2B, indicator device 1 is communicatively coupled to communication device 1000. Communication device 1000 is a computing apparatus that incorporates one or more processor devices 1005, a memory 1010, a communication interface 1015, and a user interface 1020. According to an example implementation of the present disclosure, communication device 1000 is communicatively connected to another communication device 1000' through network 1200 in a communication session—for example, via Zoom®, Skype, Google Meet®, Microsoft Teams®, FaceTime, etc. According to an example implementation, the communication session is facilitated by one or more communication server apparatuses (not shown) of network 1200.

The schematic structure of communication device 1000 illustrated in FIG. 2B is representative of communication device 1000' and, as can be appreciated by one of ordinary skill in the art, plural other communications devices 1000' (not shown) can be engaged in a communication session with communication device 1000. Example implementations of communication devices 1000 and 1000' can include any suitable type of electronic device including, but are not limited to, workstations, servers, desktop computers, mobile computers (e.g., laptops, ultrabooks), mobile phones, portable computing devices, such as smart phones, tablets, personal display devices, personal digital assistants ("PDAs"), virtual reality devices, wearable devices (e.g., watches), to name a few. According to an example implementation, indicator device 1 is coupled to communication device 1000 via a universal serial bus ("USB") port (not shown) embodied as part of communication interface 1015 of communication device 1000. In some implementations, communication interface 1015 and/or indicator device 1 can include one or more antennas to facilitate wireless communications using various wireless technologies (e.g., Bluetooth and the like). As can be appreciated by one or ordinary skill in the art, indicator device 1 can be an integrated component of communication device 1000—for example, connected via an integrated movable structure—without departing from the spirit and the scope of the present disclosure.

One or more processor(s) 1005 can include any suitable processing circuitry capable of controlling operations and functionality of communication device 1000, as well as facilitating communications between various components within communication device 1000. In some implementations, processor(s) 1005 can include a central processing unit ("CPU"), a graphic processing unit ("GPU"), one or more microprocessors, a digital signal processor, or any other type of processor, or any combination thereof. In some implementations, the functionality of processor(s) 1005 can be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 1005 can include its own local memory, which can store program systems, program data, and/or one or more operating systems.

Memory 1010 can include one or more types of storage mediums such as any volatile or non-volatile memory, or any removable or non-removable memory implemented in any suitable manner to store data for communication device 1000. For example, information can be stored using computer-readable instructions, data structures, and/or program systems. Various types of storage/memory can include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 1010 can be implemented as computer-readable storage media ("CRSM"), which can be any available physical media accessible by processor(s) 1005 to execute one or more instructions stored within memory 1010. In some implementations, one or more applications can be run by processor(s) 1005 and can be stored in memory 1010. For example, as illustrated in FIG. 1B, conference software API 1002 is executed by processor(s) 1005 and stored in memory 1010. In some implementations, other APIs (not shown) can be executed for determining operating statuses that are relevant to the illumination display modes of indicator device 1—for example, an API can be executed for determining operating statuses for a recording session in, say, a messaging application.

Communication interface 1015 can include any circuitry allowing or enabling one or more components of communication device 1000 to communicate with one or more additional devices, servers, and/or systems—for example, one or more other communication devices 1000'. For example, network(s) 1200 can be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that can be used to facilitate communications between communication devices 1000 and 1000'. Various additional communication protocols can be used to facilitate communications between communication devices 1000 and 1000' include the following non-exhaustive list, Wi-Fi (e.g., 802.11 protocol), Bluetooth, radio frequency systems (e.g., 900 MHz, 1.4 GHz, and 5.6 GHz communication systems), cellular networks, FTP, RTP, RTSP, SSH, to name a few.

Communications systems for facilitating network 1200 can include hardware (e.g., hardware for wired and/or wireless connections) and/or software. In implementations, communications systems can include one or more communications chipsets, such as a GSM chipset, CDMA chipset, LTE chipset, 4G/5G/6G, Wi-Fi chipset, Bluetooth chipset, to name a few, and/or combinations thereof. Wired connections can be adapted for use with cable, plain old telephone service (POTS) (telephone), fiber (such as Hybrid Fiber Coaxial), xDSL, to name a few, and wired connections can use coaxial cable, fiber, copper wire (such as twisted pair copper wire), and/or combinations thereof, to name a few. Wired connections can be provided through telephone ports, Ethernet ports, USB ports, and/or other data ports, such as Apple 30-pin connector ports or Apple Lightning connector ports, to name a few. Wireless connections can include cellular or cellular data connections and protocols (e.g., digital cellular, PCS, CDPD, GPRS, EDGE, CDMA2000, 1×RTT, RFC 1149, Ev-DO, HSPA, UMTS, 3G, 4G, LTE, 5G, and/or 6G to name a few), Bluetooth, Bluetooth Low Energy, Wi-Fi, radio, satellite, infrared connections, ZigBee communication protocols, to name a few. Communications interface hardware and/or software, which can be used to communicate over wired and/or wireless connections, can include Ethernet interfaces (e.g., supporting a TCP/IP stack), X.25 interfaces, T1 interfaces, and/or antennas, to name a few. Computer systems—such as communication devices 1000 and 1000'—can communicate with other computer systems or devices directly and/or indirectly, e.g., through a data network, such as the Internet, a telephone network, a mobile broadband network (such as a cellular data network), a mesh network, Wi-Fi, WAP, LAN, and/or WAN, to name a few.

As shown in FIG. 2B, communication device 1000 incorporates a user interface 1020, User interface 1020 is operatively connected to processor(s) 1005 and includes at least a camera 1025 and a microphone 1030 that are usable for communicating in a video conference with communication device 1000'. User interface 1020 can further include one or more input or output device(s), such as switch(es), button(s), key(s), a touch screen, display(s), sensor(s), speaker(s), headphones, earpiece(s), a headset, a phone transmitter/receiver, etc. (not shown) as would be understood in the art of electronic computing devices.

Controller 101 incorporates one or more processors (not shown) adapted to control the operations and functionality of indicator device 1. Example implementations of controller 101 can include those described above with respect to processor(s) 1005. In some implementations, controller 101 can incorporate a memory (not shown), example implementations of which can include those described above with respect to memory 1010. According to an example implementation, controller 101 of indicator device 1 is a human interface device (HID) that is communicatively coupled to communication device 1000—for example, via communication interface 1015—for receiving instructions or indicators for activating and deactivating light source(s) 120', including the above-described lighting modes. In an example implementation, controller 101 is coupled to an interface (not shown) to communication interface 1015 of communication device 1000. The interface can incorporate a wired connection—for example, via USB and the like—and/or a wireless connection—for example, Bluetooth and the like—to communication interface 1015.

Thus, according to an example implementation, processor(s) 1005 transmits instructions or indicators to controller 101 (e.g., via communication interface 1015) for activating and deactivating light source(s) 120' (which correspond to light sources 120-1 . . . 120-8 illustrated in FIG. 2A) based on determinations through conference software API 1002 on whether communication device 1000 is engaged in a communication session (illumination of first portion 30). Correspondingly, processor(s) 1005 transmits instructions or indicators to controller 101 (e.g., via communication interface 1015) for activating and deactivating light source(s) 120' based on determinations on whether microphone 1030 is activated or muted (illumination of second portion 40) and whether camera 1025 is activated or not (illumination of third portion 50).

In some implementations, second portion 40 and third portion 50 can be illuminated with different durations, intensities, colors, sequences, patterns, etc. based on whether the associated microphone 1030 and camera 1025 is recognized by communication device 1000, functional, in error, or the like, in addition to the above-described operating status during a communication session. Similarly, first portion 30 can be illuminated with different durations, intensities, colors, sequences, patterns, etc. based on whether communication device 1000 is the only device connected to a communication session, whether communication device 1000' is connected to the communication session with communication device 1000, and/or whether additional communication devices 1000' (not shown) are connected to the communication session.

In some example implementations, first portion 30, second portion 40, and third portion 50 can be illuminated with different durations, intensities, colors, sequences, patterns, etc., based on whether a video display is activated and/or whether an audio output is activated at communication device 1000' in connection with a communication session with communication device 1000. As described above, for example, first portion 30 of indicator device 1 can be illuminated with a pulsed or blinking light when a user at communication device 1000 is sharing screen with a user at communication device 1000' during a communication session. Additionally, webhooks, or other forms of status communication messages, can be exchanged during a communication session so that the above-described activation/deactivation/mute statuses are exchanged among communications devices 1000 and 1000'. Indicator device 1 can, thereby, be controlled to change illumination states based on the exchanged status messages.

As can be appreciated by one of ordinary skill in the art, the features and functions described herein of indicator device 1, communication device 1000, one or more other communication devices 1000' can be performed interchangeably among these entities without departing from the spirit and scope of the present disclosure. For example, the above-described functions and features associated with determining the connection status of communication device 1000 to a communication session (e.g., video conference meeting) and the corresponding operation statuses of camera 1025 and microphone 1030 can be performed at communication device 1000 or by controller 101 of indicator device 1 for activating and deactivating light source(s) 120'. As an example, controller 101 can incorporate features of API 1002 for determining the above-described operating statuses of communication device 1000 and its associated devices (such as camera 1025 and microphone 1030) for controlling light source(s) 120'. In some implementations, indicator device 1 can incorporate an independent power source (e.g., a battery) (not shown) and be in wireless communication (e.g., Bluetooth) with communication device 1000—for example, via communication interface 1015.

Figure 2C:
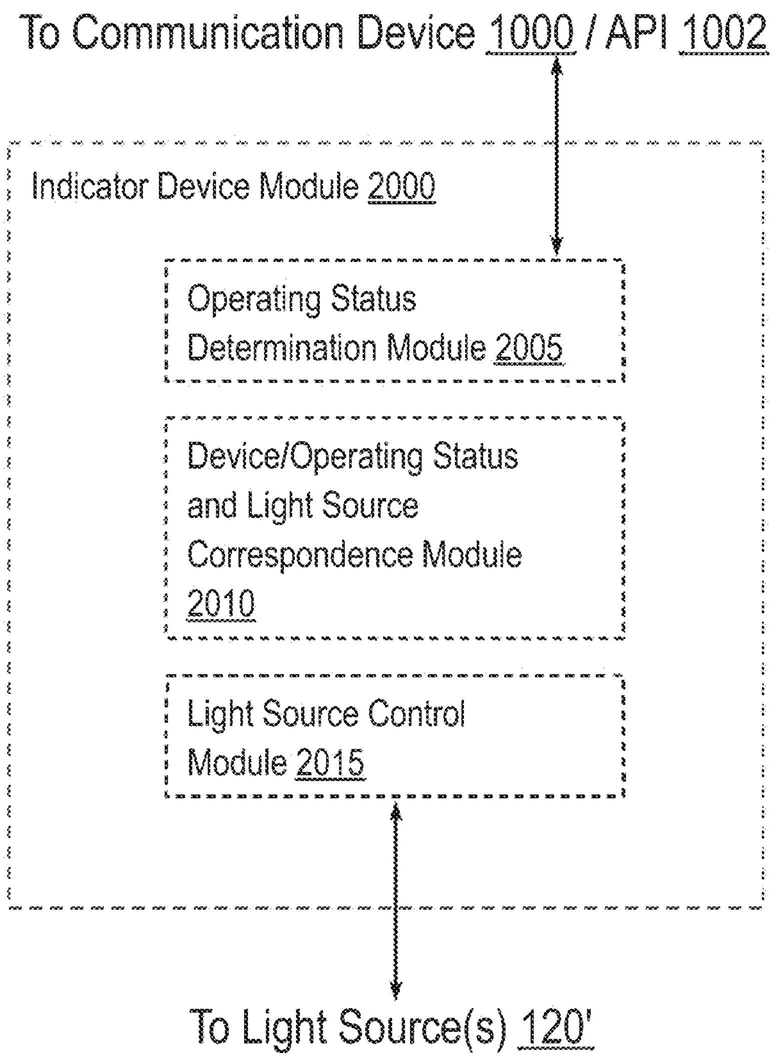
FIG. 2C is a schematic illustration of an indicator device module in accordance with an example implementation of the present disclosure.

Accordingly, FIG. 2C is a schematic illustration of an indicator device module 2000, which can be embodied by one or more hardware and/or software components incorporated at indicator device 1 (and/or communication device 1000) in accordance with an example implementation of the present disclosure. Indicator device module 2000 and its component modules can incorporate software that is executed by controller 101 (and/or processor 1005), or can embody custom hardware elements incorporated in indicator device 1 (and/or communication device 1000) such as, without limitation, the example implementations described above with respective to processor(s) 1005, memory 1010, and communication interface 1015. As illustrated in FIG. 2C, indicator device module 2000 includes an operating status determination module 2005, a device/operating status and light source correspondence module 2010, and a light source control module 2015.

According to an example implementation, operating status determination module 2005 is in communication with communication device 1000 and/or API 1002 for determining operating statuses of communication device 1000 and its components, such as camera 1025 and microphone 1030. As further illustrated in FIG. 2C, indicator device module 2000 includes a device/operating status and light source correspondence module 2010, which assigns and maintains correspondences between each operating status of each particular device (e.g., connection status of communication device 1000 to a network communication session, camera 1025 on or off in the session, microphone 1030 on or muted in the session) and respective one or more light source(s) 120' and their illumination state(s) (e.g., on, off, color, intensity, duration, sequence, pattern, etc.). In some implementations, correspondence module 2010 can be programmed and customized by a user of communication device 1000—for example, via a control application executed at communication device 1000. Based on the correspondences maintained by correspondence module 2010, light source control module 2015 controls the illumination states of light source(s) 120'. In example implementations where indicator device 1 incorporates an independent power supply assembly that incorporates a battery, operating status determination module 2005 can be coupled to the power supply assembly to determine the remaining battery life thereof. Accordingly, the remaining battery life status can be communicated to communication device 1000 and/or included in the correspondences in device/operating status and light source correspondence module 2010 with the respective one or more light source(s) 120' and their illumination state(s) (e.g., on, off, color, intensity, duration, sequence, pattern, etc.). As an example, a “low battery” warning can be included by flashing one or more of portions 30, 40, and 50 in a particular pattern, color, and the like.

Figure 4:
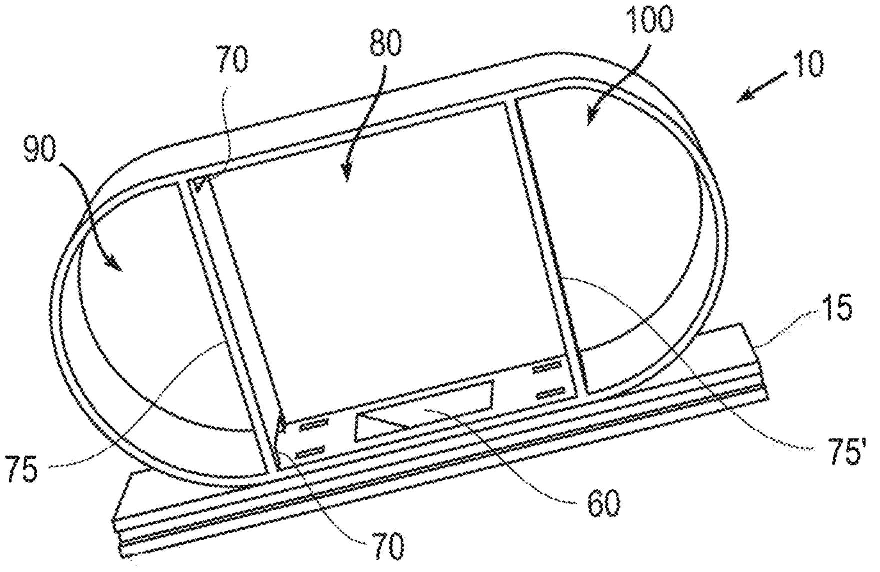
FIG. 4 is a perspective view of the uncovered housing of the indicator.
Figure 5:
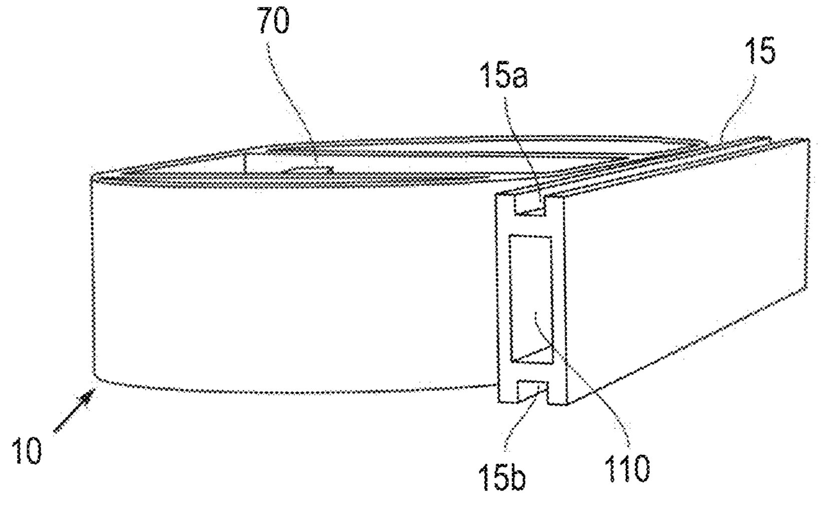
FIG. 5 is a side bottom perspective view of the uncovered housing.
Figure 6:
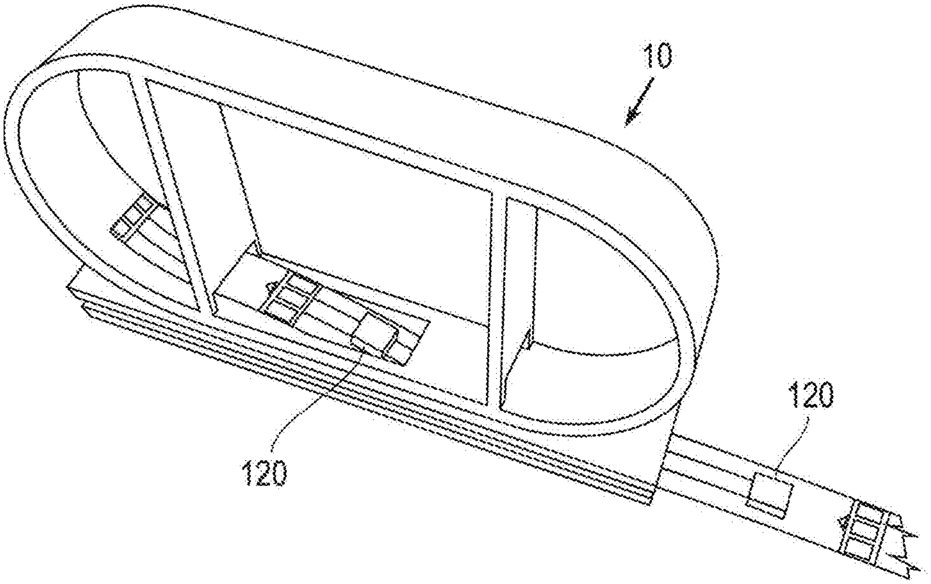
FIG. 6 is a top perspective view of the uncovered housing showing the insertion of LED lights.

According to one example implementation, the housing 10 of the device 1 is divided into three interior portions 80, 90, 100 by dividers 75, 75', as illustrated in FIG. 4. The dividers 75, 75' include through openings 70 to allow passage of wiring and lighting, etc. The housing 10 has a hollow portion 60 emanating from an opening 110 (FIG. 5) in the base portion 15. As shown in FIG. 6, a ribbon of LEDs 120 is fed into the opening 110 of the base portion 15 of the housing 10 and through hollow portion 60 into the first interior portion 80, or otherwise set within the housing 10, such as glued or otherwise affixed to the interior portion 80 thereof. The ribbon is fed through the bottom through opening 70 of the divider 75 into the second interior portion 90 along a perimeter of the interior of housing 10 and then through the top through opening 70 of the divider 75 back into the first interior portion 80 along the perimeter of the interior of housing 10 and through the top through opening 70 of the divider 75' into the third interior portion 100 along the perimeter of the interior of housing 10. Likewise, such LEDs may be otherwise set within the housing 10, such as glued or otherwise affixed to the interior portion 80 thereof.

The ribbon of LEDs 120 is configured to terminate in a female USB connector, which fits inside the base portion 15 opening 110 and serves as the connection between the indicator device 1 and the user's computer or communication device 1000. The indicator device 1, can also be self-powered, containing a battery and wireless interface, e.g. Bluetooth®, Wi-Fi, NFC, RFID, etc. to connect to the computer or communication device 1000.

Figure 7:
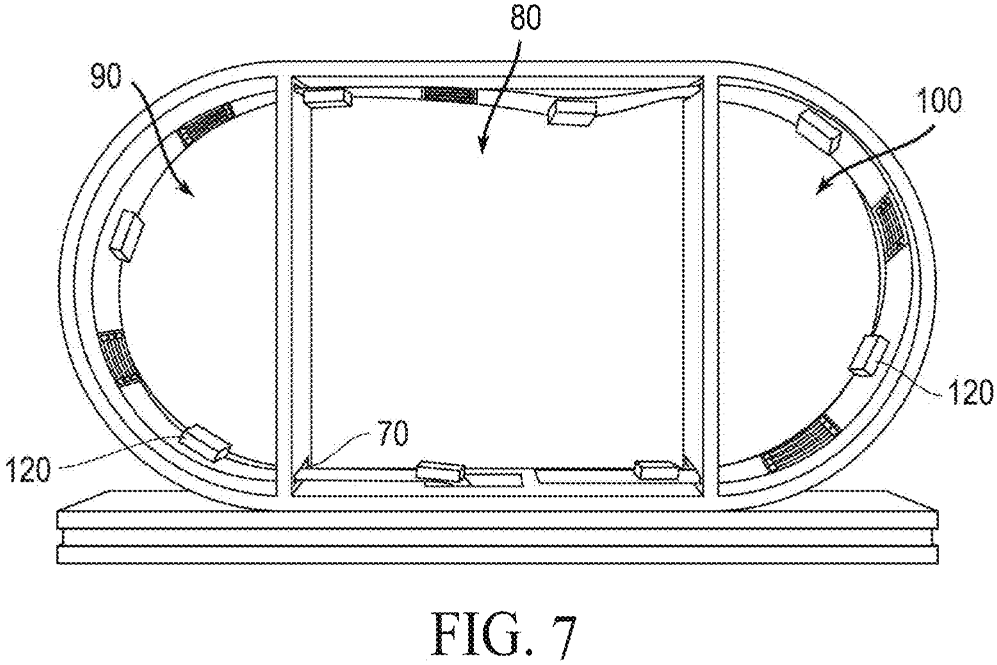
FIG. 7 is a front view of the uncovered housing showing the LED lights inserted therein.

FIG. 7 shows a configuration of 2 LEDs (120) in the second and third interior portions 90, 100 and 4 LEDs (120) for the first interior portion 80, other configurations are also possible. It is noted that the LEDs (120) of the first interior portion 80 can be configured to be greater in number or intensity in order to serve as a ring light for illuminating a user during video meetings.

Figure 8:
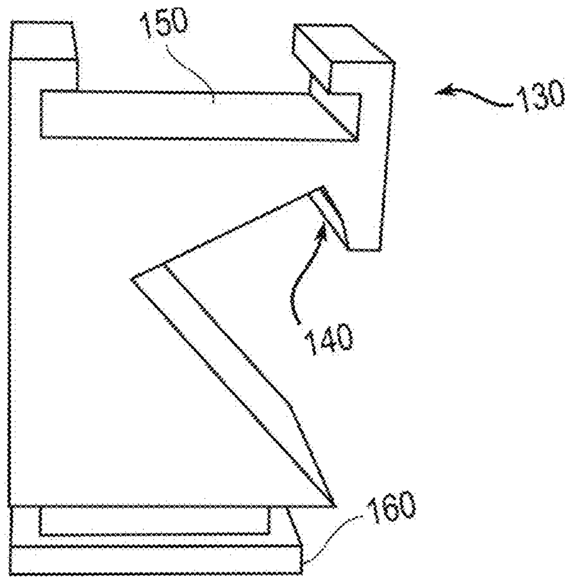
FIG. 8 is a side top perspective view of an alternate mount for the indicator.
Figure 9:
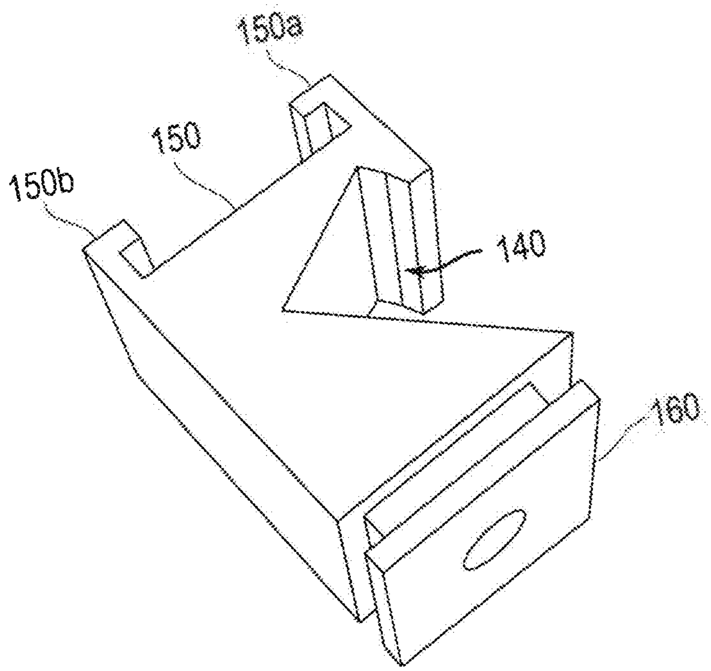
FIG. 9 is a side bottom perspective view of the alternate mount of FIG. 8.

A mount 130 is shown in FIG. 8 having a slotted portion 150, configured to receive the base portion 15 of the housing 10. The mount is configured to attach to a computer screen where lip 140 hook over a computer monitor or laptop screen. The mount 130 also includes a tripod-mounting portion 160, which can connect to a tripod or other stand type device. FIG. 9 is a lower end perspective view of mount 130 shown in FIG. 8 illustrating the underside of lip 140 for hooking over a computer monitor or laptop screen. FIG. 9 also illustrates the side profile of slotted portion 150, which incorporates two opposing ledges 150*a* and 150*b* that are adapted to be slid into corresponding slots 15*a* and 15*b* (see FIG. 5) on the front and back sides of base portion 15 as indicator device housing 10 is slid into engagement with mount 130.

Figure 10:
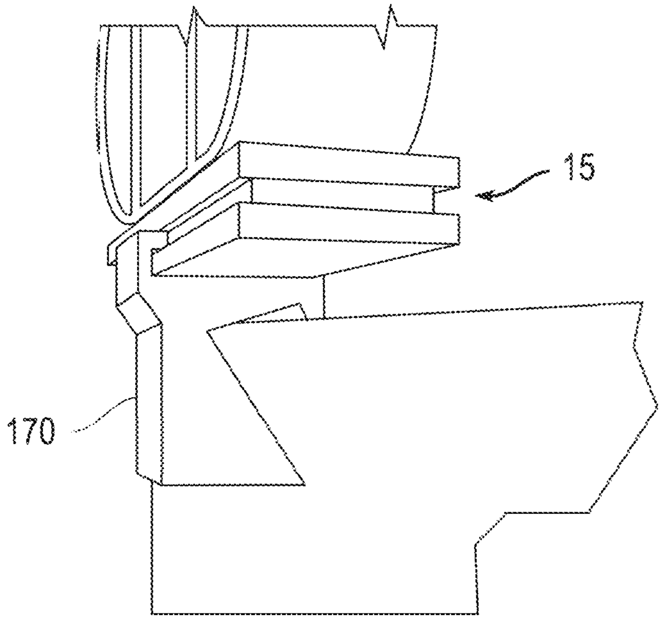
FIG. 10 shows a further alternate mount, with an on-air status indicator mounted thereon, mounted on a computer.
Figure 11:
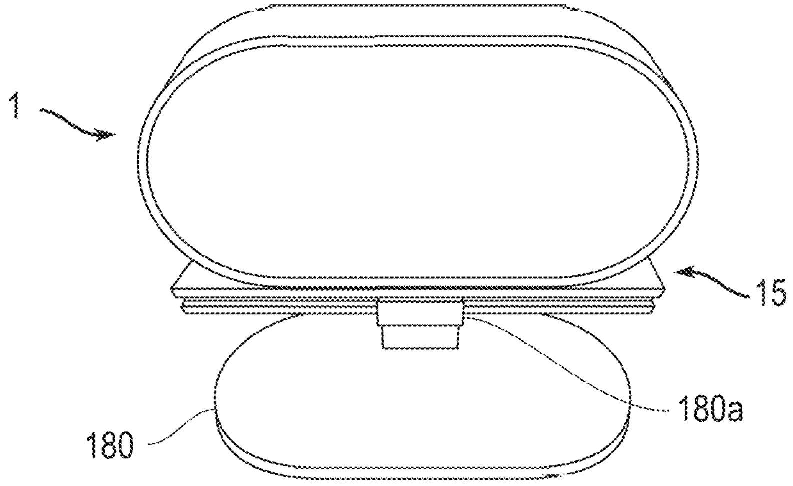
FIG. 11 shows the indicator with the housing cover attached to the housing, which is in turn attached to a freestanding mount.
Figure 12:
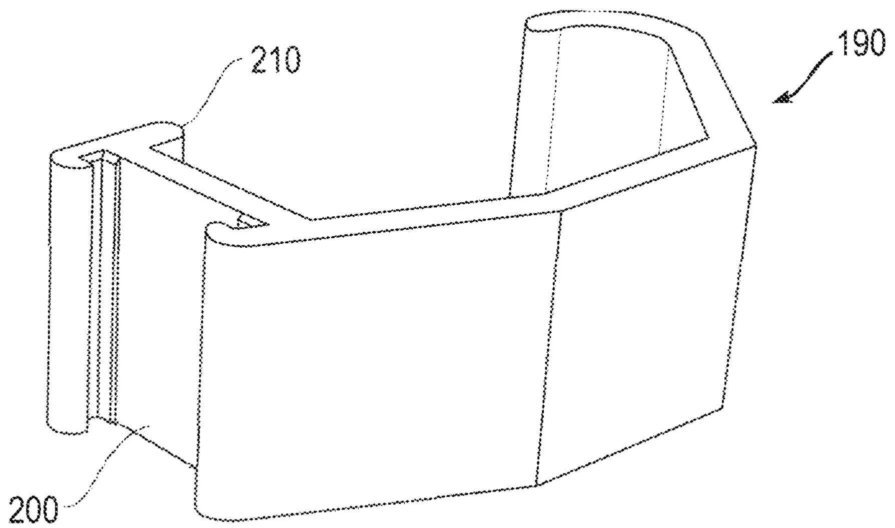
FIG. 12 is perspective view of a further alternate mount.
Figure 13:
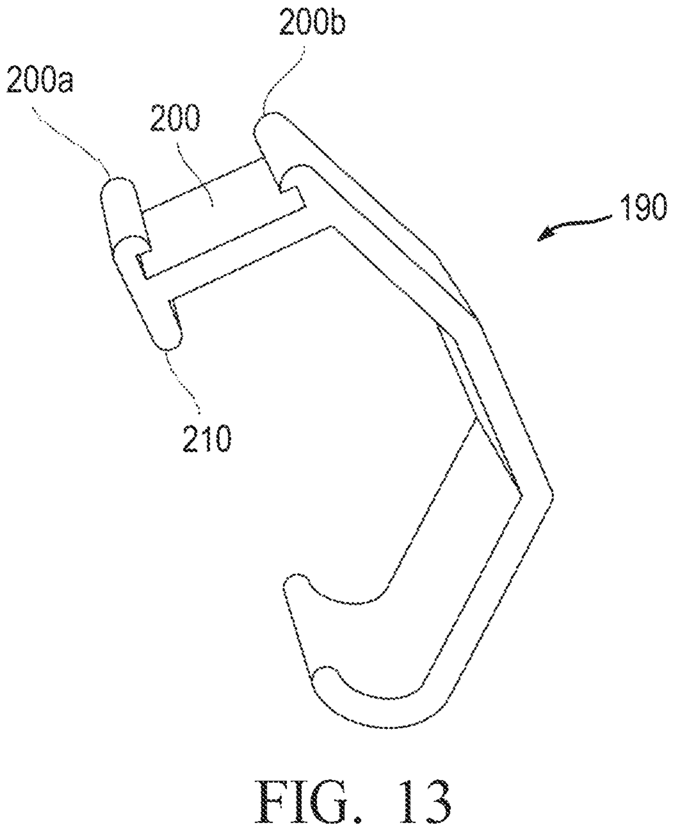
FIG. 13 is a side view of the mount of FIG. 12.

An alternative mount 170 is shown in FIG. 10 mounted on a chair, providing indication to people approaching from behind a user of the user's status. The device 1 can also be mounted to a freestanding stand 180, as shown in FIG. 11. FIG. 11 is a front view of stand 180 and further illustrates a front ledge element 180*a*, which corresponds to a rear ledge element (not shown) on the rear side of stand 180. Front ledge element 180*a* and the rear ledge element (not shown) of stand 180 correspond to opposing ledges 150*a* and 150*b* shown in FIG. 9 and are adapted to be slid into corresponding slots 15*a* and 15*b* (see FIG. 5) on the front and back sides of base portion 15 as indicator device housing 10 is slid into engagement with stand 180. A further alternative mount 190 is shown in FIGS. 12 and 13 having a slotted portion 200, configured to receive the base portion 15 of the housing 10. As with slotted portions 150 and 180, slotted portion 200 incorporates a front ledge element 200*a* and a rear ledge element 200*b*, which correspond to opposing ledges 150*a* and 150*b* shown in FIG. 9 and front ledge 180*a* shown in FIG. 11. According to an example implementation, ledges 200*a* and 200*b* are adapted to be slid into corresponding slots 15*a* and 15*b* (see FIG. 5) on the front and back sides of base portion 15 as indicator device housing 10 is slid into engagement with mount 190.

Figure 14:
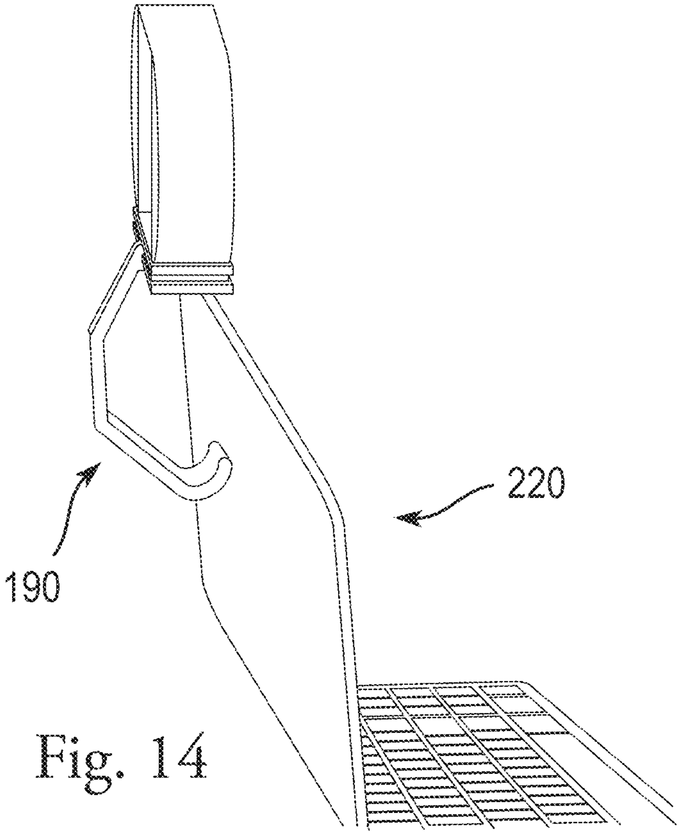
FIG. 14 shows the mount of FIG. 12, with an on-air status indicator mounted thereon, mounted on a computer, viewed from the side.
Figure 15:
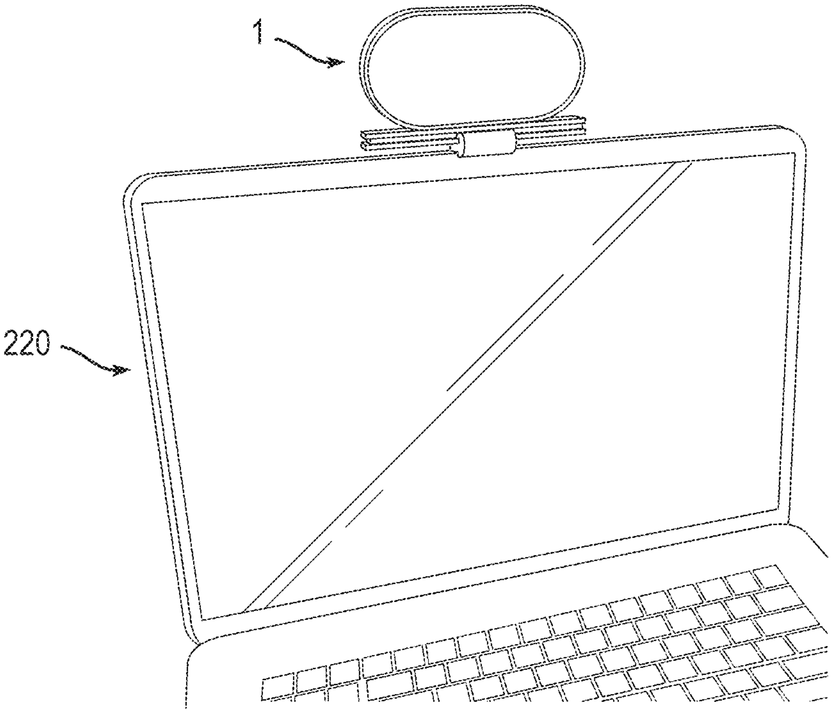
FIG. 15 shows the on-air status indicator mounted on a computer, viewed from the front.

The mount 190 is configured to attach to a computer screen where lip 210 hooks over a computer monitor or laptop screen. Thus, indicator device housing 10 can be mounted to a computer screen after being coupled to mount 190. Mount 190 is configured to adapt to laptop screens 220 and monitors of different thicknesses owing to its curved configuration. FIGS. 14 and 15 show a side view and a front view, respectively, of mount 190 mounted on a laptop computer screen 220.

Figure 16:
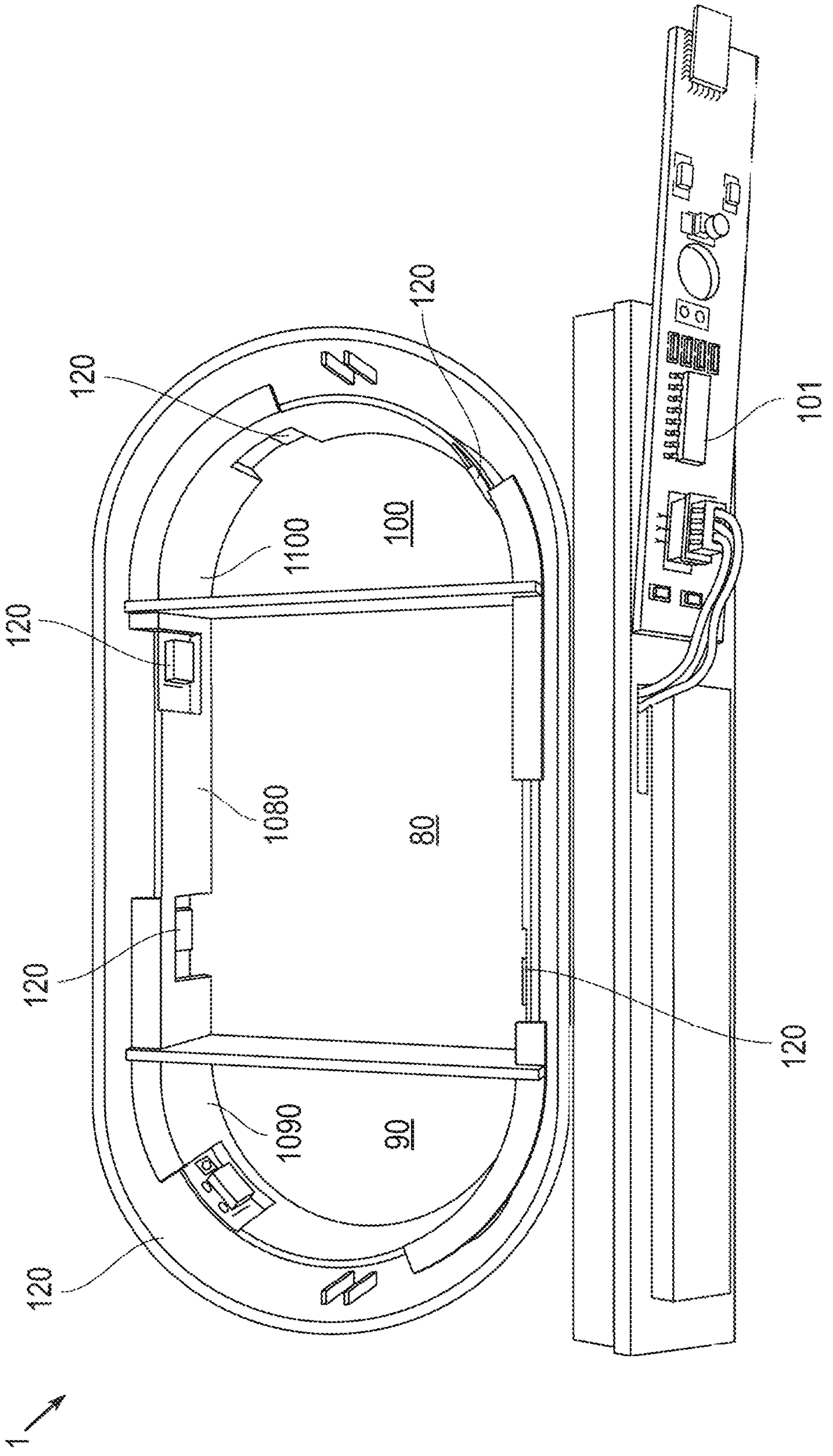
FIG. 16 is a front view of an uncovered housing showing the LED lights inserted therein in accordance with another example implementation of the present disclosure.

FIG. 16 is an illustration an internal configuration of indicator device 1 according to another example implementation of the present disclosure. As illustrated in FIG. 16, first, second, and third interior portions 80, 90, and 100 incorporate respective interior housing wall sections 1080, 1090, and 1100 that are adapted to hold in place light sources 120 and their respective connections to one another and/or to controller 101. According to an example implementation, interior housing wall sections 1080, 1090, and 1100 at least partially incorporate translucent material to allow for light transmission from light sources 120 into respective interior portions 80, 90, and 100 and, in turn, out through first, second, and third portions 30, 40, and 50, respectively.

In an example implementation, on-air indicator device 1 is also incorporated into a system having software, which allows the device 1 to interface with a user's conferencing program to illuminate the device to clearly show whether a user is in a meeting, if the microphone is on and/or if the camera is on.

As described above, API 1002 incorporates features corresponding to operating status determination module 2005 in scanning communication device 1000—as an example, with a Python script every 2-3 seconds—for a change in status based on elements associated with a conference application that is executed on communication device 1000—for example, Zoom, Teams, etc. According on one example implementation, API 1002 scans respective indicators (e.g., icons) corresponding to operating statuses of microphone 1030 and camera 1025 in a conference application. According to another example implementation, one or more graphical user interface ("GUI") Buttons (not shown) can be provided via user interface 1020 at communication device 1000 to provide a user with direct systemic control for muting microphone 1030 ("Mic Mute") and/or deactivating camera 1025 ("Cam Mute"). According to example implementations, the GUI controls of these devices are provided through a script or using commands at the Hardware Abstraction Layer (HAL). Thus, a user can click on a Mic Button at communication device 1000 (not shown) to activate or mute microphone 1030 at a system (e.g., operating system or "OS") level. Correspondingly, a microphone status icon displayed at communication device 1000 (e.g., on an ongoing video conference) is changed to reflect mute/unmute status and the "Mic light"(e.g., second portion 40) is turned on or off at indicator device 1. Likewise, a user can click on a Cam Button at communication device 1000 (not shown) to activate or mute camera 1025 at a system (e.g., OS) level. Correspondingly, a camera status icon displayed at communication device 100 is changed to reflect mute/unmute status and the "Cam light" (e.g., third portion 50) is turned on or off at indicator device 1. In example implementations, first portion 30 can remain tied to API 1002—e.g., Zoom, Teams, etc.—and/or use webhooks to reflect a "meeting status" and can also be programmed to blink or pulse when sharing screen. According to an example implementation, the aforementioned GUI Buttons (not shown) are displayed in the Menu Bar on a Mac OS computer and the System Tray in a Microsoft Windows computer. In example implementations, the GUI Buttons can be Pop Out displays that remain on top of a OS GUI display.

In some implementations, one or more of first, second, and third portions 30, 40, and 50 can be programmed to automatically turn on if and when software corresponding to indicator device 1 is initiated or executed at communication device 1000. Advantageously, indicator device 1 would illuminate and indicate that devices such as microphone 1030 and camera 1025 are being monitored for operating status by indicator device 1. As described above, first portion 30 can be synchronized with conference software API 1002—by using Webhooks or the API 1002 itself—to reflect Meeting Status, e.g., "in meeting" or "sharing screen." The different statuses can be indicated by changing the color of the light and/or using pulsed or blinking modes (e.g., changing an illumination period of the first, second, and/or third portion 30, 40, and/or 50 of indicator device 1).

In some implementations, first, second, and third portions 30, 40, and 50 can be operated in a "Manual Mode," whereby a user can manually control indicator device 1 via user interface 1020 at communication device 1000. Accordingly, the user can manually activate one or more of first, second, and third portions 30, 40, and 50 of indicator device 1 using a GUI interface at communication device 1000 (not shown) to serve as a "Do Not Disturb" indicator to those in the vicinity of the user, regardless of meeting, microphone, and camera statuses.

Portions of the methods described herein can be performed by software or firmware in machine-readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several example implementations, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A peripheral device adapted for use with a communication device coupled to a microphone and a camera, said peripheral device comprising:

a housing having at least one illumination surface adapted to be viewable from a side of the peripheral device, the at least one illumination surface comprising a first portion, a second portion, and a third portion;

a controller; and an interface to the communication device, wherein the controller causes the first portion of the at least one illumination surface to be illuminated upon determining that a meeting has been initiated via a communication application executed on the communication device, the controller causes the second portion of the at least one illumination surface to be illuminated upon determining that a first user command has been issued at the communication device to activate the microphone and causes the second portion of the at least one illumination surface to be deactivated upon determining that a second user command has been issued at the communication device to deactivate the microphone; and the controller causes the third portion of the at least one illumination surface to be illuminated upon determining that a third user command has been issued at the communication device to activate the camera and causes the third portion of the at least one illumination surface to be deactivated upon determining that a fourth user command has been issued at the communication device to deactivate the camera.

2. The peripheral device of claim 1, wherein the first user command, the second user command, the third user command, and the fourth user command are issued in response to one or more respective user inputs associated with a Graphical User Interface (GUI) control display element.

3. The peripheral device of claim 2, wherein the GUI control display element is independent from the communication application executed on the communication device.

4. The peripheral device of claim 2, wherein the GUI control display element is displayed in an operating system display element.

5. The peripheral device of claim 2, wherein GUI control display element comprises a first display portion, a second display portion, and a third display portion, the first display portion of the GUI control display element illuminates and deactivates in correspondence with the first portion of the at least one illumination surface, the second display portion of the GUI control display element illuminates and deactivates in correspondence with the second portion of the at least one illumination surface, and the third display portion of the GUI control display element illuminates and deactivates in correspondence with the third portion of the at least one illumination surface.

6. The peripheral device of claim 1, wherein the first user command, the second user command, the third user command, and the fourth user command are operating system commands.

7. The peripheral device of claim 1, wherein the first user command and the second user command cause the microphone to activate and deactivate, respectively, and the third user command and the fourth user command cause the camera to activate and deactivate, respectively.

8. The peripheral device of claim 7, wherein the first user command, the second user command, the third user command, and the fourth user command cause the respective activations and deactivations through one or more application programming interfaces (APIs).

9. The peripheral device of claim 1, wherein the controller causes the illuminated first portion of the at least one illumination surface to change in one or more of a color and an illumination period upon determining that a shared screen mode has been activated for the meeting via the communication application executed on the communication device.

10. A peripheral device adapted for use with a communication device coupled to a microphone and a camera, said peripheral device comprising:

a housing having at least one illumination surface adapted to be viewable from a side of the peripheral device, the at least one illumination surface comprising a first portion, a second portion, and a third portion;

a controller; and an interface to the communication device, wherein the controller causes the first portion of the at least one illumination surface to be illuminated upon determining that an application associated with the indicator device is executed at the communication device;

the controller causes the illuminated first portion of the at least one illumination surface to change in one or more of a color and an illumination period upon determining that a meeting has been initiated via a communication application executed on the communication device, the controller causes the second portion of the at least one illumination surface to be illuminated upon determining that a first user command has been issued at the communication device to activate the microphone and causes the second portion of the at least one illumination surface to be deactivated upon determining that a second user command has been issued at the communication device to deactivate the microphone; and the controller causes the third portion of the at least one illumination surface to be illuminated upon determining that a third user command has been issued at the communication device to activate the camera and causes the third portion of the at least one illumination surface to be deactivated upon determining that a fourth user command has been issued at the communication device to deactivate the camera.

11. The peripheral device of claim 10, wherein the first user command, the second user command, the third user command, and the fourth user command are issued in response to one or more respective user inputs associated with a Graphical User Interface (GUI) control display element.

12. The peripheral device of claim 11, wherein the GUI control display element is independent from the communication application executed on the communication device.

13. The peripheral device of claim 11, wherein the GUI control display element is displayed in an operating system display element.

14. The peripheral device of claim 11, wherein GUI control display element comprises a first display portion, a second display portion, and a third display portion, the first display portion of the GUI control display element illuminates and deactivates in correspondence with the first portion of the at least one illumination surface, the second display portion of the GUI control display element illuminates and deactivates in correspondence with the second portion of the at least one illumination surface, and the third display portion of the GUI control display element illuminates and deactivates in correspondence with the third portion of the at least one illumination surface.

15. The peripheral device of claim 10, wherein the first user command, the second user command, the third user command, and the fourth user command are operating system commands.

16. The peripheral device of claim 10, wherein the first user command and the second user command cause the microphone to activate and deactivate, respectively, and the third user command and the fourth user command cause the camera to activate and deactivate, respectively.

17. The peripheral device of claim 16, wherein the first user command, the second user command, the third user command, and the fourth user command cause the respective activations and deactivations through one or more application programming interfaces (APIs).

18. The peripheral device of claim 10, wherein the controller causes the illuminated first portion of the at least one illumination surface to change in one or more of the color and the illumination period upon determining that a shared screen mode has been activated for the meeting via the communication application executed on the communication device.

19. A computer-implemented method for displaying a Graphical User Interface (GUI) on-air status indicator display element on a communication device, comprising:

displaying an illumination surface of the GUI on-air status indicator display element, said illumination surface comprising a first portion, a second portion, and a third portion;

causing the first portion of the illumination surface to be illuminated in a first illumination mode upon determining that a meeting has been initiated via a communication application executed on the communication device, causing the second portion of the illumination surface to be illuminated in a second illumination mode upon determining that a microphone coupled to the communication device is live in association with the meeting via the communication application, and causing the third portions of the illumination surface to be illuminated in a third illumination mode upon determining that a camera coupled to the communication device is broadcasting in association with the meeting via the communication application.

* * * * *